(12) United States Patent
Yoshida et al.

(10) Patent No.: US 8,266,786 B2
(45) Date of Patent: Sep. 18, 2012

(54) BELT ASSEMBLING APPARATUS AND METHOD, AND BELT MANUFACTURING METHOD

(75) Inventors: Michio Yoshida, Toyota (JP); Daisuke Kobayashi, Mishima (JP); Shinya Kuwabara, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 158 days.

(21) Appl. No.: 12/919,788

(22) PCT Filed: Feb. 25, 2009

(86) PCT No.: PCT/JP2009/053379
§ 371 (c)(1),
(2), (4) Date: Aug. 27, 2010

(87) PCT Pub. No.: WO2009/107641
PCT Pub. Date: Sep. 3, 2009

(65) Prior Publication Data
US 2011/0016693 A1    Jan. 27, 2011

(30) Foreign Application Priority Data
Feb. 28, 2008    (JP) .................. 2008-047849

(51) Int. Cl.
*B23P 21/00*    (2006.01)
(52) U.S. Cl. ........................................................ 29/721
(58) Field of Classification Search .................... 29/717, 29/716, 700, 721, 822
See application file for complete search history.

(56) References Cited

U.S. PATENT DOCUMENTS
4,828,247 A * 5/1989 Matsuo et al. ................ 271/240

FOREIGN PATENT DOCUMENTS
| DE | 103 54 702 A1 | 6/2005 |
| EP | 1 094 242 A1 | 4/2001 |
| JP | 58-050139 | 3/1983 |
| JP | 62 140243 | 9/1987 |
| JP | 63 140143 | 6/1988 |
| JP | 2 76941 | 3/1990 |
| JP | 2000 205342 | 7/2000 |
| JP | 2001-336903 | 12/2001 |

OTHER PUBLICATIONS

Office Action issued Feb. 2, 2012, in European Patent Application No. 09715595.6.
Office Action issued Mar. 12, 2012, in Chinese Patent Application No. 200980106863.4.

* cited by examiner

*Primary Examiner* — John C Hong
(74) *Attorney, Agent, or Firm* — Oblon, Spivak, McClelland, Maier & Neustadt, L.L.P.

(57) ABSTRACT

To assemble a belt including a plurality of elements and a ring for fastening the element efficiently. A belt assembling apparatus for fastening a plurality of plate-like elements being juxtaposed in a same orientation annularly by a ring includes a load applying mechanism, which applies a load to the ring or to the elements which have already been fastened by the ring during a process of fastening the elements sequentially by the ring, thereby widening a clearance in an array of the elements being fastened by the ring. Therefore, the clearance to which the last piece of the element to be fastened by the ring is inserted can be widened relatively so that the element is allowed to be inserted into the clearance easily.

10 Claims, 5 Drawing Sheets

Related Art

BELT ASSEMBLING APPARATUS AND METHOD, AND BELT MANUFACTURING METHOD

TECHNICAL FIELD

This invention relates to an assembling apparatus and an assembling method for assembling a belt, by juxtaposing a plurality of plate-like elements and by fastening those elements in a circular manner using a ring.

BACKGROUND ART

A belt formed by juxtaposing a plurality of metal pieces called an "element" or a "block" in a circular manner, and by fastening the juxtaposing metal pieces by an endless carrier (called a "ring" or a "hoop") is known in the prior art to be used in a continuously variable transmission. The belt of this kind is adapted to transmit the torque by a pushing force among the metal pieces thus juxtaposed to be contacted to one another. Specifically, the metal pieces existing in the groove of a drive pulley are sequentially pushed out of the groove by a rotation of the pulley while pushing the metal pieces in front of those metal pieces. The metal pieces thus being pushed forward are eventually entered into a groove of a driven pulley. As a result, the torque of the drive pulley is transmitted to the driven pulley by such advancement of the metal pieces.

Figure 8:
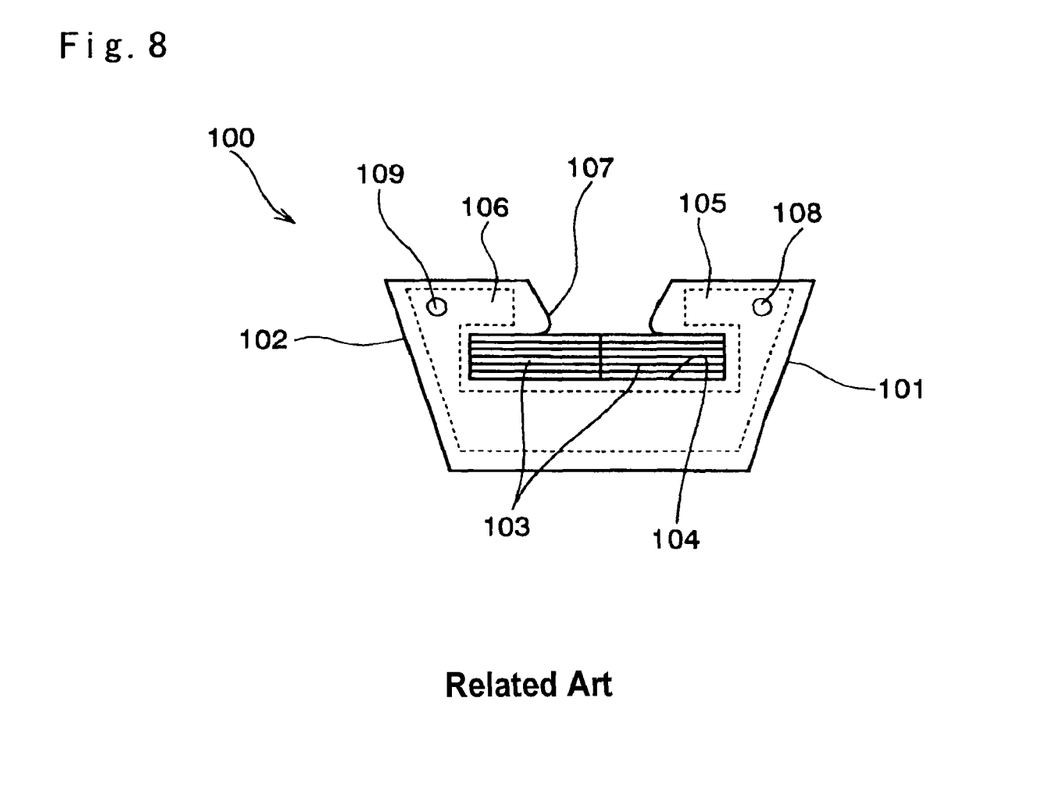
FIG. 8 is a front view showing a block the conventional belt.

An example of the belt thus structured is disclosed in Japanese Patent Laid-Open No. 2000-205342. According to the teachings of Japanese Patent Laid-Open No. 2000-205342, an annular belt is formed by fastening a plurality of trapezoidal blocks using two rows of endless carriers. A block 100 is shown in FIG. 8 of the present application in more detail. The blocks 100 shown in FIG. 8 are juxtaposed annularly in an orientation to situate a short side thereof in an inner circumferential side. Lateral faces 101 and 102 of the block 100 thus juxtaposed are respectively inclined to be parallel to inner faces of a V-shaped groove of a not shown pulley. In the width center at the center of height of the block 100, there is formed a saddle face 104 on which the endless carriers 103 are disposed. A width of the saddle face 104 is wider than the total width of the carried 103 arranged parallel to each other.

In addition, in order to prevent a detachment of the endless carrier 103 from the saddle face 104, in other words, in order to prevent a disengagement of the block 100 from the endless carrier 103, the block 100 comprises stopper portions 105 and 106. Specifically, a shape of the stopper portions 105 and 106 is inverse L-shaped portion, and those the stopper portions 105 and 106 are erected respectively on both width ends of the saddle face 104 to cover width end portions of the endless carriers 103 from above. A clearance between the stopper portions 105 and 106 serves as an opening 107 to the saddle face 104. Protruding portions 108 and 109 whose cross-section is arcuate are respectively formed on one of the faces (e.g., on the front face) of the stopper portions 105 and 106, and (not shown) concave portions are respectively formed on the opposite side of the protruding portions 108 and 109. Therefore, the protruding portions 108 and 109 are respectively inserted into the concave portions of the adjoining block 100.

The belt for continuously variable transmission thus has been explained is adapted to transmit the torque by the pushing force among the blocks. For this purpose, the blocks 100 are juxtaposed tightly to one another in order not to create clearances thereamong, and fastened by the endless carriers. According to the belt taught by Japanese Patent Laid-Open No. 2000-205342, the endless carriers are situated in the width center of the block. Therefore, the blocks being juxtaposed tightly in a circular manner cannot be fastened by the carrier entirely at the same time. For this reason, the blocks have to be fastened by the endless carrier one by one, or several pieces at a time.

However, as previously mentioned, the blocks are juxtaposed by inserting the protruding portion loosely into the concave portion of the adjoining block. Therefore, in case of inserting the last piece of the blocks to be fastened into an array of the blocks already been fastened by the endless carrier, only a clearance comparable with a thickness of the last piece of the blocks to be fastened is available in the array of the blocks. For this reason, the protruding portion of the last piece of the blocks to be fastened may be contacted with the blocks already been fastened by the endless carrier, and this makes the assembling work difficult at the final phase. Especially, since a circumferential length of the belt assembled in a circular manner is relatively shorter in its inner circumferential side, the clearances among the juxtaposed elements are narrowed in the inner circumferential side of the belt. Therefore, in case the protruding portions and the concave portions are formed on the block in the inner circumferential side of the annular belt, the assembling work of the belt has to be much more difficult.

DISCLOSURE OF THE INVENTION

The present invention has been conceived noting the technical problems thus far described, and its object is to assemble or manufacture a belt efficiently by fastening a plurality of elements using a ring.

In order to achieve the above-mentioned object, according to the present invention, there is provided a belt assembling apparatus for fastening a plurality of plate-like elements being juxtaposed in a same orientation annularly by a ring, characterized by comprising: a load applying means, which applies a load to the ring or to the elements which have already been fastened by the ring during a process of fastening the elements sequentially by the ring, thereby widening a clearance in an array of the elements being fastened by the ring.

Specifically, the load applying means includes a means which applies a pulling force to elongate the ring elastically.

In addition, the load applying means includes a means which increases a contact pressure among the elements fastened by the ring.

According to another aspect of the present invention, there is provided a belt assembling method for fastening a plurality of plate-like elements being juxtaposed in a same orientation annularly by a ring, characterized by comprising: applying a load to the ring or to the elements which have already been fastened by the ring during a process of fastening the elements sequentially by the ring, thereby widening a clearance in an array of the elements being fastened by the ring; and inserting another element to be fastened by the ring into the widened clearance in the element array.

The aforementioned load to be applied to widen the clearance in the array of the elements includes a load to increase a pulling force to elongate the ring elastically, and a load to increase the contact pressure among the elements fastened by the ring.

According to still another aspect of the present invention, there is provided a manufacturing method of a belt, in which a plurality of plate-like elements being juxtaposed in a same orientation is fastened annularly by a ring, characterized by comprising: fastening the elements sequentially by the ring; applying a load to a ring or to the elements which have already been fastened by the ring thereby widening a clearance in an array of the elements being fastened by the ring; and inserting another element to be fastened by the ring into the widened clearance in the element array.

According to the above-mentioned assembling apparatus, assembling method, and manufacturing method of a belt, the element to be used comprises a saddle face on which the ring is disposed; a stopper portion, which is erected respectively on width ends of the saddle face to protrude toward an outer circumferential side in case the elements are juxtaposed in a circular manner, and which is adapted to hold the ring disposed on the saddle face. Meanwhile, the ring includes a plurality of rings arranged parallel to each other on the saddle face.

In addition to above, according to the present invention, the element further comprises a protruding portion which is formed on one of front and rear faces thereof, and a concave portion into which the protruding portion is inserted loosely and which is formed on the other face.

According to the apparatus and method of the present invention, the belt is assembled by fastening the elements by the ring sequentially while inserting the elements to be fastened by the ring into a clearance in the array of the elements previously fastened by the ring. However, a load is applied to the ring or to the elements during such assembling work to widen the clearance in the array of the elements previously fastened by the ring. Therefore, the remaining elements to be fastened by the can be inserted easily into the clearance in the array of the elements being fastened by the ring. As described, the saddle face is formed on the width center of the element, and the stopper portions are formed on the width ends of the saddle face. However, the clearance in the element array at a portion to which the remaining element is to be inserted is thus widened relatively. Therefore, even if the element is turned around when inserted into the clearance in the element array and the ring is twisted partially in this situation, the assembling work of the belt can be executed smoothly. As also described, the protruding portion is formed on the element to interlink the elements loosely. However, the clearance in the array of the elements which have already been fastened by the ring is elongated wider than a protruding length of the protruding portion. Therefore, the element can be inserted easily into the clearance in the element array being fastened by the ring without contacting the protruding portion with the elements in the element array. Thus, according to the present invention, a belt can be assembled efficiently by fastening the plurality of elements by the ring in a circular manner.

BEST MODE FOR CARRYING OUT THE INVENTION

Figure 6:
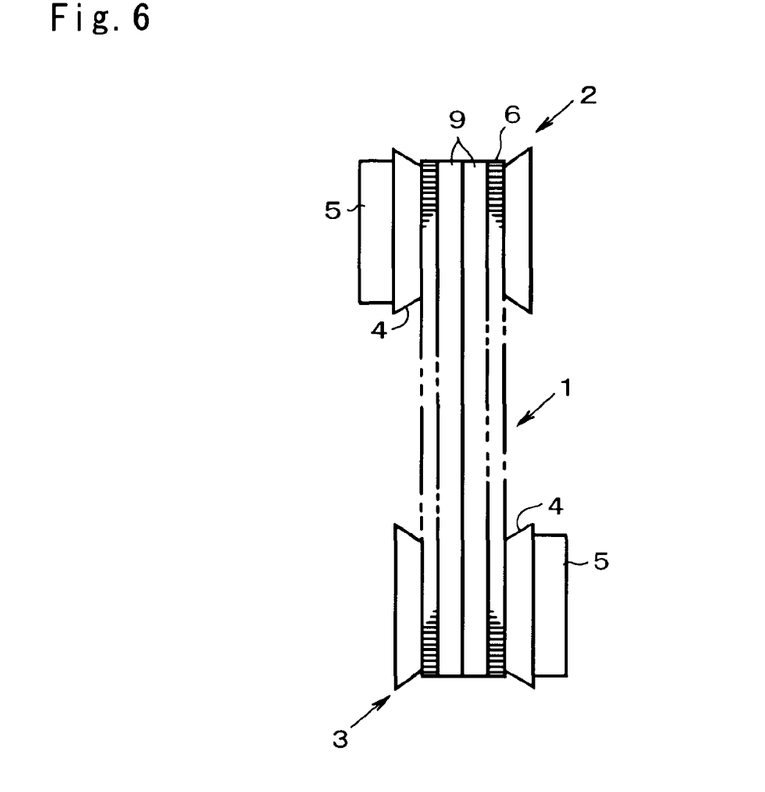
FIG. 6 is a view schematically showing a continuously variable transmission using a belt to which a present invention is applied.

Next, examples of the present invention will be explained hereinafter. For example, a belt to which the present invention is applied is adapted to be used in a continuously variable transmission. Specifically, a groove whose cross-sectional shape is V-shape is formed on an outer circumference of the pulley of the continuously variable transmission, and the belt is applied to the groove of the pulley for the purpose of transmitting torque by a frictional force between the belt and pulleys. For example, as schematically shown in FIG. 6, a belt 1 is applied to a drive pulley 2 and a driven pulley 3 of the continuously variable transmission. Each pulley 2 and 3 comprises a pair of fixed sheave and movable sheave individually having a tapered face and being opposed to each other. Therefore, V-shaped groove 4 is formed between those sheaves, and a width of the groove 4 is varied by reciprocating the movable sheave by an actuator 5 such as hydraulic cylinder.

Figure 7:
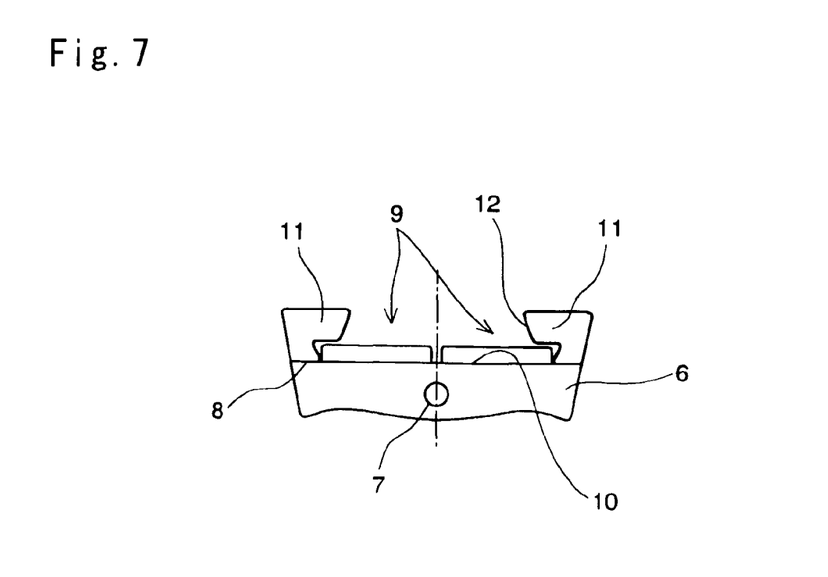
FIG. 7 is a front view showing an element of the belt to which a present invention is applied.

The belt 1 thus used is formed by fastening a plurality of elements in a circular manner by a ring, and both side faces or lateral faces of the element are tapered to be V-shaped. FIG. 7 shows an example of an element 6 used in the belt 1 shown in FIG. 6. Specifically, the element 6 is a plate-like member made of metal, and the elements 6 of same configuration and same dimensions are juxtaposed annularly in the same orientation. For the purpose of positioning the juxtaposed elements 6 vertically and horizontally, a male connection 7 as a protrusion is formed on one of the faces of the element 6, and a (not shown) female connection as a hole into which the male connection 7 is inserted loosely is formed on the opposite face. Specifically, the hole is formed by partially depressing one of the faces of the element 6, and the male connection 7 is thereby protruded from the opposite face of the element 6. Therefore, by inserting the male connection 7 into the hole of the adjoining element, a relative movement of the juxtaposed elements 6 in the radial direction, that is, in the vertical and horizontal directions can be restricted.

As described, the elements 6 are juxtaposed in a circular manner. Therefore, some of the elements 6 are inevitably juxtaposed not parallel to one another, in other words, some of the elements 6 being juxtaposed are inevitably spread like a fan (i.e., radially) around a center of curvature of the belt 1. In order to allow the elements 6 thus oscillated in a fan-like fashion to be contacted with one another, a rocking edge 8 is formed on the element 6. Specifically, the rocking edge 8 is a boundary or a boundary area at which the thickness of the element 6 is changed, and the rocking edge 8 is formed at a substantially center of the element 6 in the height direction while extending in a width direction of the element 6 (i.e., in a direction parallel with a rotational center axis of the pulley).

In case the belt 1 is applied to the pulleys 2 and 3, a circumferential length of an array of the elements 6 is longer at an upper side of the element 6 (that is, at an outer circumferential side of the belt 1). Therefore, clearances between the elements 6 around the pulley are widened at the upper portion thereof. To the contrary, the circumferential length of the array of the elements 6 is shorter at a lower side of the element 6 (that is, at an inner circumferential side of the belt 1). Therefore, the clearances between the elements 6 are narrowed at the lower portion thereof. For this reason, a thickness of the lower portion of the element 6 is reduced gradually toward a lower end thereof, and the portion at which the thickness of the element 6 is thus changed serves as the rocking edge 8. Thus, the element 6 is allowed to oscillate with respect to the rocking edge 8 to spread in the fan-like fashion, that is, a pitching of the elements 6 is allowed by the rocking edge 8. In addition, the rocking edge 8 is necessary to be formed only on one of the faces of the element 6. For example, the rocking edge 8 is formed on the face on which the male connection 7 is formed.

The element 6 further comprises a saddle face 10 on which a ring 9 is disposed (or arranged). Since the ring 9 fastening the elements 6 is thus contacted with the saddle face 10, a contact pressure between the ring 9 and the saddle face 10 is increased in case the belt 1 is transmitting the torque. Meanwhile, when the elements 6 moving ahead in the straight region enter into the groove of the pulleys 2 or 3 and oscillated in the fan-like fashion, the ring 9 slides on the saddle face 10 and this will result in a generation of large frictional force. Therefore, in order not to increase a moment resulting from such frictional force, the saddle face 10 is formed on a portion close to the rocking edge 8 as much as possible. That is, the saddle face 10 is formed at a substantially intermediate portion in the height direction of the saddle face 10.

The ring 9 of the belt 1 is formed by accumulating thin metal layers, and two rows of the rings 9 are arranged parallel to each other in the width direction thereof on the saddle face 10 thereby fastening the elements 6. For this purpose, a width of the saddle face 10 is wider than a total width of the rings 9 thus arranged parallel to each other. According to the present invention, the ring 9 is disposed on the saddle face 10 to fasten the element array in the circular manner and to hold the elements 6 not to deviate outwardly in the radial direction. However, in addition to the above-mentioned functions, the ring 9 also functions to draw the elements 6 being discharged from the groove of the pulley 2 or 3 out of the groove. For this purpose, in order to prevent the ring 9 from deviating radially outwardly from the elements 6, a stopper portion is formed to hold the ring 9 in the space between the stopper portion and the saddle face 10.

In the example shown in FIG. 7, a hook portion 11 is erected respectively on both width ends of the element 6 while extending upwardly and covering the saddle face 10 partially from above. As shown in FIG. 7, the hook portion 11 is a latch (or inversed L-shaped) portion adapted to hold the width ends of the rings 9 disposed parallel to each other loosely in the clearances between the saddle face 10 and the hook portion 11. End portions of each hook portion 11 are distant from each other, and a clearance therebetween serves as an opening 12 to the saddle face 10. The clearance between the hook portions 11, in other words, an opening width of the saddle face 10 is wider than a width of one of the rings 9, but narrower than a total width of two rows of rings 9.

As described, according to the example of the belt 1 to which the present invention is applied, the individual width of the ring 9 is thus narrower than the width of the opening 12 of the element 6, but the total width of two rows of the rings 9 is thus wider than the width of the opening 12 of the element 6. Therefore, in case of fastening all of the elements 6 by one of the rings 9 previously and then fastening the elements 6 by the other ring 9, the elements 6 fastened by one of the rings 9 may be disengaged from the ring 9 during the subsequent fastening work of the element 6 by the other ring 9. Thus, the elements 6 cannot be fastened by the rings 9 smoothly. In addition, the total width of the two rows of rings 9 arranged parallel to each other in the length direction is wider than the width of the opening 12. That is, the rings cannot be disposed on the saddle face 10 of the element 6 while being situated parallel to each other. Therefore, according to the present invention, the belt 1 is assembled and manufactured by a procedure and an apparatus to be explained hereinafter.

Figure 1:
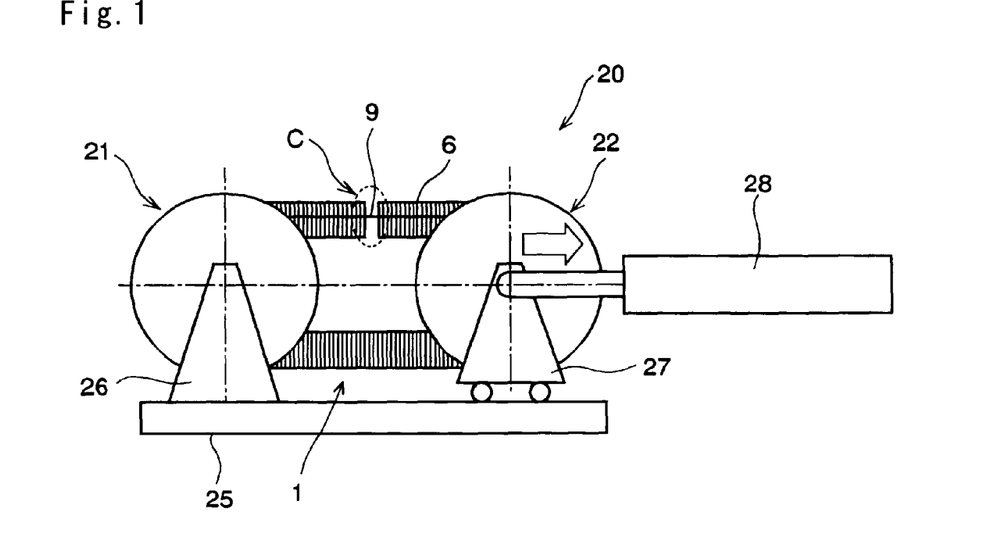
FIG. 1 is a front view schematically showing an assembling apparatus according to the present invention.

FIG. 1 is a front view schematically showing an assembling apparatus according to the present invention. As shown in FIG. 1, the assembling apparatus 20 is adapted to hold two rows of the rings 9 parallel to each other elliptically or ovally to form the belt 1. Specifically, the assembling apparatus 20 comprises a pair of pulleys 21 and 22 to which the ring 9 fastening the elements 6 is applied. Those pulleys 21 and 22 are arranged in a manner to align axes of those pulleys 21 and 22 horizontally parallel to each other on a same level.

Figure 2:
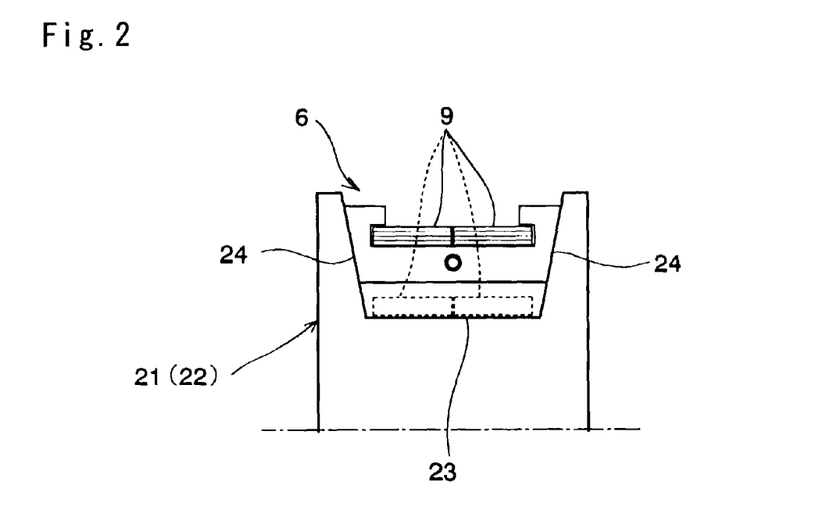
FIG. 2 is a partial view showing a groove of a pulley.

As shown in FIG. 2, the pulleys 21 and 22 respectively comprise a trunk portion 23 on its outer circumference, and inclined inner walls 24 are formed on both side ends of the trunk portion 24 to extend toward the outer circumferential side thereby forming a groove. Therefore, the ring 9 is applied directly to the trunk portion 23 before fastening the element 6, and the element 6 fastened by the ring 9 is sandwiched between the inner walls 24 while being contacted therewith.

The pulley 21 is a fixed pulley held rotatably by a fixed stand 26 fixed on a platform 25, and the other pulley 22 is a movable pulley held rotatably by a movable stand 27 installed on the platform 25 in a movable manner.

In order to move the movable stand 27 toward the fixed stand 26 and away from the fixed stand 26, there is provided an actuator 28. The actuator 28 is a direct acting type actuator fixed to the platform 25. In addition, an actuator to be used as the actuator 28 can be selected according to need, for example, an actuator, in which a pinion engaged with a hydraulic cylinder and a rack is rotated by a motor, can be used as the actuator 28.

Figure 3:
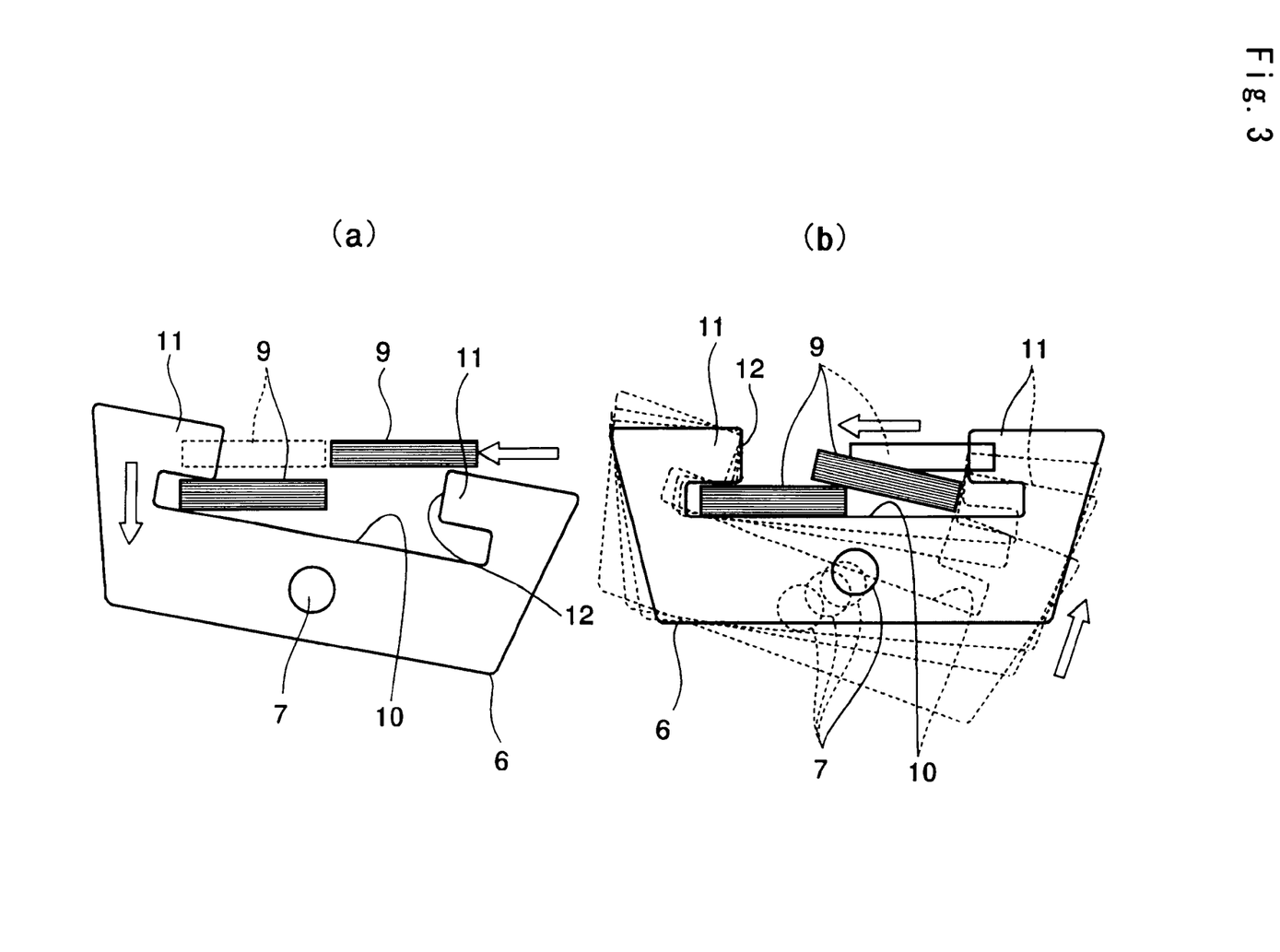
FIG. 3 is an explanation drawing explaining a procedure of fastening elements by two rows of rings.

Next, a procedure to assemble the belt 1, that is, an assembling method and a manufacturing method according to the present invention will be explained hereinafter. First of all, the movable pulley 22 is moved sufficiently closer to the fixed pulley 21, and two rows of the rings 9 are applied to the pulleys 21 and 22 in parallel with each other. Then, the movable pulley 22 is moved backwardly by the actuator 28. As a result, a distance between the pulleys 21 and 22 is widened, and the rings 9 are thereby strained linearly between the pulleys 21 and 22. The rings 9 thus strained can be loosened by adjusting a tension pulling the rings 9. Therefore, using this principle, the element 6 is attached to the rings 9 at an intermediate portion of each of the ring 9 between the pulleys 21 and 22. The procedure to attach the element 6 to the rings 9 is shown in FIG. 3.

As described, the element 6 comprises hook portions 11 on the width ends of the saddle face 10. Therefore, the element 6 is situated under the rings 9 first of all at the aforementioned intermediate portion, in a manner to orient the opening 12 thereof to open to an inner circumferential faces of the rings 9. Then, a side edge (i.e., an outer side edge) of one of the rings 9 is inserted into a space between the saddle face 10 and one of the hook portions 11. In this situation, said one of the ring 9 is pulled downwardly together with the element 6 toward the inner circumferential side thereof, as shown in FIG. 3(*a*). As a result, levels of two rows of the rings 9 which are formerly arranged parallel to each other closely, or which are formerly arranged parallel to each other while contacting inner side edges thereof are differentiated in the vertical direction. In this situation, however, a total width of two rows of the rings 9 is still wider than the opening width of the opening 12 of the element 6. Therefore, the other ring 9 is not allowed to enter into the opening 12 to be disposed on the saddle face 10.

Then, the upper ring 9 of the rings 9 thus split vertically, that is, the ring 9 not yet disposed on the saddle face 10 of the element 6 is moved relatively in its width direction toward the outer circumference of the ring 9 being pulled downwardly together with the element 6. For this purpose, the upper ring 9 to be disposed on the saddle face 10 has to be deformed partially widthwise. As described, the portion of the ring 9 to which the element 6 is attached is straightened loosely so that the rings 9 can easily be overlapped partially in its thickness direction. In addition, the ring 9 thus moved in its width direction will not be moved widthwise entirely. That is, as shown in FIG. 3(b), the upper ring 9 is moved widthwise partially while being twisted to be overlapped partially on the lower ring 9.

As a result of thus overlapping the two rows of rings 9 partially, the total width of the rings 9 is reduced to be narrower than before so that at least the (outer) side edge of the upper ring 9 is allowed to enter into the opening 12 of the element 6. Then, as indicated by broken lines and an arrow in FIG. 3(b), the element 6 is pivoted counterclockwise around the one of the hook portions 11 (i.e., around the left hook portion 11 in FIG. 3). As a result, the other hook portion 11 is moved upwardly so that the outer side edge of the upper ring 9 is allowed to enter into a space between the saddle face 10 and the other hook portion 11.

Then, the element 6 is lifted, and the upper ring 9 thus deformed to be overlapped on the lower ring 9 is returned to be parallel to the lower ring 9. As a result, attachment of the element 6 to the two rows of rings 9 is completed. The element 6 thus attached to the rings 9 is then moved along the rings 9 away from the straight region of the rings 9 strained loosely so as to clear the portion of the rings 9 to which the elements 6 are attached, and the remaining elements 6 are attached to the rings 9 by the procedure thus has been explained.

In addition, the element 6 can be attached to the rings 9 one by one. Alternatively, a plurality of the elements 6 may also be attached to the rings 9 simultaneously by holding the plurality of elements 6 in a (not shown) holder, and attaching the elements 6 in the holder to the rings 9 at the same time. Further, the elements 6 may also be attached to the rings 9 automatically using an automated machinery or an industrial robot (not shown) adapted to handle the elements 6 as explained above, instead of attaching the element 6 to the rings 9 manually.

With the progression of the assembling work thus attaching the elements 6 to the rings 9 individually or unit by unit, the elements 6 are eventually attached to the rings 9 even around the pulleys 21 and 22. Consequently, the elements 6 are attached to the rings 9 almost entirely except for a clearance to which the last piece or the last several pieces of the element 6 is/are inserted. In this situation, the clearance C in the array of the elements 6 already fastened by the rings 9 is almost equivalent to a thickness of the element 6 except protruding length of the male connection 7. That is, the clearance C is insufficient for the element 6 to be inserted therein smoothly. Specifically, the male connection 7 has to be contacted with another element 6 in the array when inserted into the clearance C. Thus, it is difficult to insert the element 6 into the clearance C.

In order to avoid such difficulty, the rings 9 are elongated elastically by increasing a pulling force of the actuator 28 when attaching the last piece or the last several pieces of the element(s) 6 to the rings 9. In this case, the pulling force of the actuator 28 is set to the extent that a tension on the ring 9 will not be increased excessively in order not to hamper attachment of the element 6 to the ring 9. As a result, the clearance C is widened so that the last piece or the last several pieces of the element(s) 6 is/are allowed to be inserted smoothly into the clearance C. Accordingly, the actuator 28 corresponds to the load applying means of the present invention.

After all of the elements 6 have been attached to the rings 9, the aforementioned movable stand 27 is moved toward the fixed stand 26 thereby shortening the distance between the pulleys 21 and 22. Then, the assembled belt 1 is dismounted from the pulleys 21 and 22.

According to the above-explained example, the clearance C to which the last piece(s) of the element 6 is inserted is thus widened by elongating the rings 9 elastically. Alternatively, according to the present invention, the clearance C may also be widened by contacting the elements 6 being fastened by the rings 9 more tightly, or by compressing the elements 6 being fastened by the rings 9 elastically in its thickness direction.

Figure 4:
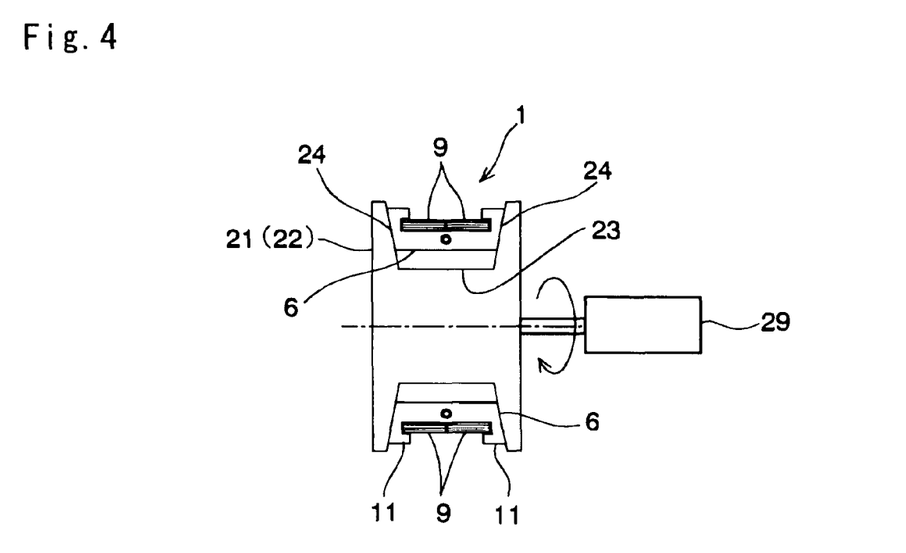
FIG. 4 is a view schematically showing an example of applying a torque to the pulley using a motor.

For example, as shown in FIG. 4, a motor 29 is provided to apply a torque to at least one of the pulleys 21 and 22. Accordingly, the motor 29 corresponds to the load applying means of the present invention. Specifically, the motor 29 may be connected directly with a (not shown) rotating shaft on which the pulley 21 (or 22) is mounted. Alternatively, the motor 29 may also be connected indirectly with a (not shown) rotating shaft on which the pulley 21 (or 22) is mounted through a (not shown) transmission mechanism such as a gear.

In this case, when the pulley 21 (or 22) on which the elements 6 are fastened by the rings 9 is rotated by the motor 29, the elements 6 on the pulleys 21 (or 22) are moved forward, and the elements 6 thus moved forward are respectively pushed onto the element 6 in front of the pushed elements 6. As a result, the elements 6 are contacted tightly and each clearance between the elements 6 is thereby narrowed. In this situation, a rotation of the other pulley 21 or 22 is halted thereby stopping the progression of the array of the elements 6. Therefore, the elements 6 thus stopped are pushed by the following elements 6 still being moved forward by the rotating pulley 21 or 22, and elements 6 are thereby compressed elastically. As a result, a total circumferential length of the array of the elements 6 is relatively shortened so that the clearance C between both ends of the array of the elements 6 is widened.

Thus, the last piece or the last several pieces of the element 6 can be inserted easily into the clearance C by widening the clearance C by applying torque to one of the pulleys 21 and 22 using the motor 29. As described, the elements 6 can be moved by rotating one of the pulleys 21 and 22 by thus applying torque thereto using the motor 29. Therefore, the elements 6 which have already been attached to the rings 9 can be moved away from the place where the attachment of the element 6 to the rings 9 takes place, by setting the rotational direction of the pulleys 21 and 22 to the direction to move the elements 6 attached to the rings 9 toward the lower straight region of the rings 9. Consequently, the elements 6 can be attached to the rings 9 consecutively so that the assembling work can be facilitated.

Figure 5:
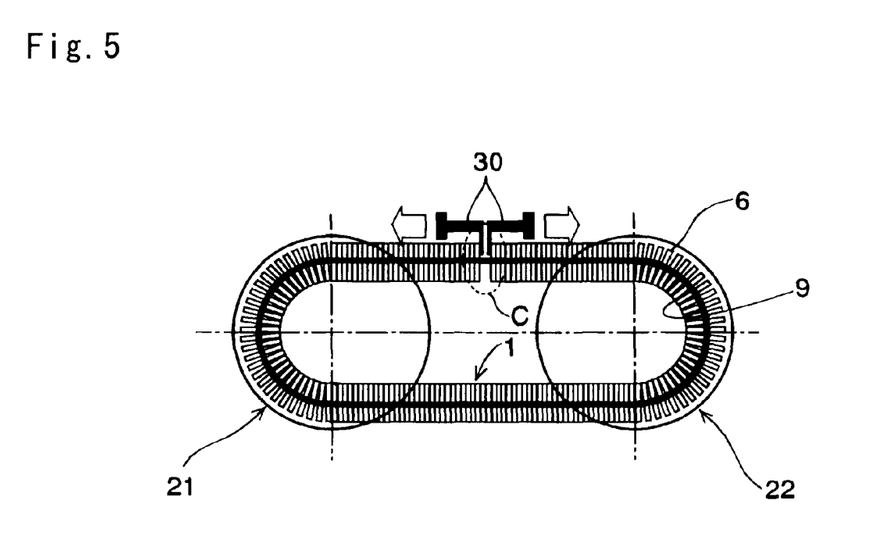
FIG. 5 is a view schematically showing an example of widening a clearance between the elements using a claw tool.

Alternatively, a claw tool 30 may also be used as the load applying means for widening the clearance C to which the element 6 is inserted. Specifically, as shown in FIG. 5, the tool 30 is inserted into a clearance between any of the adjoining elements 6 to create and widen the clearance C. According to the example thus structured, a load can be applied to the elements 6 which have already been attached to the rings 9 in a direction to compress the elements 6. As a result, the elements 6 are contacted tightly and compressed elastically in its thickness direction. Therefore, the clearance C can be widened and the last piece or the last several pieces of the elements 6 can be inserted into the clearance C easily.

Lastly, the present invention should not be limited to the examples thus far explained. For example, the number of the rings for fastening the elements should not be limited to the two rings. Specifically, the element array may also be fastened by a single ring or three or more rows of the rings. In addition, as the conventional elements, two pairs of male connection (or protrusion) and female connection (or hole) may also be formed on the element. Further, a cylinder or rack and pinion may also be interposed between two members to which the ring is applied for the purpose of applying a tension to the ring thereby widening a distance between the two members.

The invention claimed is:

1. A belt assembling apparatus for fastening a plurality of plate-like elements being juxtaposed in a same orientation annularly by a ring, comprising:
   a pair of pulleys arranged while aligning axes thereof parallel to each other, and the ring fastening the elements is applied to those pulleys; and
   an actuator, which moves one of the pulleys away from the other pulley thereby elongating the belt applied to those pulleys elastically,
   wherein a clearance in the elements fastened by the ring is widened by moving said one of the pulleys away from the other pulley thereby elongating the belt.

2. The belt assembling apparatus as claimed in claim 1, wherein:
   the element comprises
      a saddle face on which the ring is disposed, and
      a stopper portion, which is erected respectively on width ends of the saddle face to protrude toward an outer circumferential side in case the elements are juxtaposed in a circular manner, and which is adapted to hold the ring disposed on the saddle face; and
   the ring includes a plurality of rings arranged parallel to each other on the saddle face.

3. The belt assembling apparatus as claimed in claim 2, wherein the element further comprises:
   a protruding portion which is formed on one of front and rear faces thereof; and
   a concave portion into which the protruding portion is inserted loosely and which is formed on the other face.

4. The belt assembling apparatus as claimed in claim 1, wherein the element further comprises:
   a protruding portion which is formed on one of front and rear faces thereof; and
   a concave portion into which the protruding portion is inserted loosely and which is formed on the other face.

5. The belt assembly apparatus as claimed in claim 1, further comprising:
   a motor that applied a torque to at least one of the pair of pulleys to move the plurality of elements so as to reduce a clearance between the plurality of elements.

6. The belt assembly apparatus as claimed in claim 1, wherein the pair of pulleys each include a trunk portion on an outer circumference of each of the pair of pulleys and include inclined inner walls that extend from the trunk portion, and
   wherein the trunk portion holds the ring and the inclined inner walls contact the plurality of plate-like elements on the ring.

7. A belt assembling apparatus for fastening a plurality of plate-like elements being juxtaposed in a same orientation annularly by a ring, comprising:
   a pair of pulleys arranged while aligning axes thereof parallel to each other; and the ring fastening the elements is applied to those pulleys; and
   a motor, which tightly contacts the elements fastened in one of straight regions between the pulleys thereby widening a clearance in the elements fastened in the other straight region, by applying a torque to one of the pulleys while halting a rotation of the other pulley.

8. The belt assembling apparatus as claimed in claim 7, wherein:
   the element comprises
      a saddle face on which the ring is disposed, and
      a stopper portion, which is erected respectively on width ends of the saddle face to protrude toward an outer circumferential side in case the elements are juxtaposed in a circular manner, and which is adapted to hold the ring disposed on the saddle face; and
   the ring includes a plurality of rings arranged parallel to each other on the saddle face.

9. The belt assembling apparatus as claimed in claim 8, wherein the element further comprises:
   a protruding portion which is formed on one of front and rear faces thereof; and
   a concave portion into which the protruding portion is inserted loosely and which is formed on the other face.

10. The belt assembling apparatus as claimed in claim 7, wherein the element further comprises:
   a protruding portion which is formed on one of front and rear faces thereof; and
   a concave portion into which the protruding portion is inserted loosely and which is formed on the other face.

* * * * *